(12) United States Patent
Saga et al.

(10) Patent No.: US 7,773,483 B2
(45) Date of Patent: Aug. 10, 2010

(54) INFORMATION RECORDING APPARATUS

(75) Inventors: Hideki Saga, Fuchu (JP); Koichi Watanabe, Hachioji (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 590 days.

(21) Appl. No.: 11/705,493

(22) Filed: Feb. 13, 2007

(65) Prior Publication Data

US 2007/0291614 A1   Dec. 20, 2007

(30) Foreign Application Priority Data

Jun. 19, 2006   (JP) ............................. 2006-168778

(51) Int. Cl.
G11B 20/14 (2006.01)
G11B 5/00 (2006.01)
G11B 7/12 (2006.01)
G11B 7/0045 (2006.01)

(52) U.S. Cl. ................ 369/59.24; 369/47.51; 369/47.5; 369/59.11

(58) Field of Classification Search .............. 369/59.24, 369/59.25, 59.22, 54, 47, 58, 47.15, 48, 47.49, 369/47.51, 116, 124.01, 59.23, 53.26, 53.27, 369/59.13

See application file for complete search history.

(56) References Cited

U.S. PATENT DOCUMENTS

| | | | |
|---|---|---|---|
| 5,513,165 A | 4/1996 | Ide et al. | |
| 5,590,111 A | 12/1996 | Kirino et al. | |
| 5,642,343 A | 6/1997 | Todo et al. | |
| 5,732,061 A | 3/1998 | Kirino et al. | |
| 5,732,062 A | 3/1998 | Yokoi et al. | |
| 6,256,277 B1 * | 7/2001 | Saga et al. | ............... 369/59.24 |
| 6,411,579 B2 | 6/2002 | Nobukuni et al. | |
| 6,661,760 B2 | 12/2003 | Nobukuni et al. | |
| 7,050,377 B1 | 5/2006 | Nobukuni et al. | |
| 7,085,215 B2 | 8/2006 | Nobukuni et al. | |
| 2004/0136307 A1 | 7/2004 | Ito et al. | |
| 2006/0023591 A1 | 2/2006 | Ushiyama et al. | |

FOREIGN PATENT DOCUMENTS

| | | |
|---|---|---|
| JP | 5-298737 | 11/1993 |
| JP | 8-7277 | 1/1996 |
| JP | 9-134525 | 5/1997 |
| JP | 11-175976 | 7/1999 |
| JP | 2001-31936 | 11/2001 |

* cited by examiner

Primary Examiner—Joseph H Feild
Assistant Examiner—Nicholas Lee
(74) Attorney, Agent, or Firm—Antonelli, Terry, Stout & Kraus, LLP.

(57) ABSTRACT

The objects of the present invention are to facilitate the driving of the recording energy source, and to secure sufficient cooling time of the recording medium to promote the high-speed formation of high-precision marks and to provide high-speed and large-capacity information recording apparatuses at a low cost. To achieve the above objects, at the time of information recording, p is chosen as the integer constant for marks natural number k times long of the detection window width by referring to the mark length in the recording data sequence, the recording data sequence is discriminated according to the quotient obtained by and the remainder remaining after dividing k+p by two or more integer constants, and the energy generating means is driven according to different procedures based on the result of discrimination obtained thereby.

2 Claims, 8 Drawing Sheets

INFORMATION RECORDING APPARATUS

CLAIM OF PRIORITY

The present application claims priority from Japanese application JP 2006-168778 filed on Jun. 19, 2006, the content of which is hereby incorporated by reference into this application.

FIELD OF THE INVENTION

The present invention relates to an information recording apparatus for recording information by injecting energy on the recording medium and forming marks of different physical characteristic from the unrecorded part, and in particular to an optical disk apparatus.

BACKGROUND OF THE INVENTION

The optical disks generally available on the market today can be broadly classified into dye-type disks that create marks by changing locally the chemical composition or optical characteristic of the recording film principally made of a pigment or pigments by heating the same, magneto-optical disk that create marks by inverted magnetic domain on the recording film resulting from heating the perpendicular magnetic recording film and phase change disks that create marks by amorphous domain on the recording medium by changing the peak temperature at the time of heating the recording film and cooling speed by controlling the amount of energy inputted at the time of heating. The means of improving the information transfer speed during the time of recording or reproduction on these optical disks includes increasing recording linear density or increasing the scanning speed of the recording medium by light spot. The means of increasing the recording linear density includes the direct method of scaling down marks and space length themselves, the method of reducing the unit of change in the length of symbols (marks and spaces) and thus reducing the length of time for detecting the mark edge position. However, in any of these means of increasing recording linear density, the deterioration of signal-to-noise ratio in the regenerative signals proves to be a problem, and in the present technical condition it is hopeless to expect any improvement in information transfer speed by improving recording linear density.

For the purpose of forming high-precision and miniscule marks on an optical disk and improving recording linear density, according to the first prior art described in JP-A No. 298737/1993, the method of forming the recording waveform corresponding to the mark-forming period from a series of pulse sequences corresponding to the mark length of the recording data sequence and controlling the number and amplitude of each pulse according to the length of the recording data sequence has been disclosed. The recording waveform of the mark-forming period is divided into two parts: the top part and the succeeding part, and the pulse height of each pulse is generally different. In addition, during the mark non-forming period of a recording waveform, after the preposition of a space part, recording auxiliary pulses for preheating the recording medium are generated. By the method described above, according to the first prior art publication document, the heat diffusion from the preceding mark-forming part to the immediately following the leading edge position of the mark can be supplemented not by the space length, the mark width and the mark edge position can be controlled very precisely, and as a result recording linear density can be improved. Here, the mark-forming period is defined as the period from the first pulse rise to the last pulse fall of the pulses having an energy level for supplying recording energy necessary for forming a single mark, in other words the pulses having an energy level without the generation of which no mark is formed, by reflecting the mark length in the recording data sequence as shown in FIG. 3. And the mark non-forming period is defined as the period other than the mark-forming period reflecting the length of space in recording data sequence. The definitions given above shall be common in the description of the present Specification.

The second prior art described in JP-A No. 7277/1996 discloses a method of breaking up each recording data into a plurality of basic elements of different length, correlating each element to a single recording pulse, and forming a series of recording marks as a succession of respectively independent recording marks by each recording pulse. The second prior art publication document describes that no decline in the level of reproduce signals results from the recording of independent marks by this method in the middle of any marks and that stable recording can be maintained even by the modulation method including long marks. It further states that on rewrite-type recording medium, it is possible to contain any increase in jitter of regenerative signals after a large number of rewriting and as a result it is possible to improve recording linear density.

In addition, the third prior art described in JP-A No. 134525/1997 discloses a method that, in the case of recording of either one of even mark length or odd mark length for the recording channel clock cycle in the multi-pulse recording method including the top heating pulse, the succeeding plural rear heating pulses, the rear cooling pulses and the final tail cooling pulse, the method of bringing the pulse length of the rear heating pulse and the rear cooling pulse to almost the same as the recording channel clock cycle. The third prior art publication document discloses that this method can secure a sufficient cooling time of the recording medium, enables to control precisely the edge position and consequently to increase the information recording speed at the time of recording by improving recording linear density.

The fourth prior art described in JP-A No. 175976/1999 discloses an information recording apparatus for recording information by injecting energy on the recording medium and by forming marks of different physical characteristic from that of the unrecorded part including an encoder for converting information into recording data sequences, a means for classifying marks natural number n times long of the detection window width according to the remainder remaining after dividing n by an integer constant of 2 or more by referring to the length of marks in the recording data sequence, an energy generator for generating the energy necessary for recording, and the driver of the energy generator for changing the pulse number of the injected energy in the mark-forming period depending on the length of marks in the recording data sequence, wherein the driver is a means for driving the energy generator according to the different procedure based on the result of classification of the classifier. As the fourth prior art enables to secure sufficient cooling time of the recording medium or to reduce the frequency spectrum of the laser driving current, it will be possible to form marks with a sufficient precision even during a high-speed information recording, and to secure both a sufficient recording linear density and reliability.

And the fifth prior art described in JP-A No. 331936/2001 discloses an information recording apparatus that, for recording mark length modulated information with a plurality of recording mark lengths on the recording medium, (i) divides the time length nT of recording mark in the order of $\eta1T$, $\alpha1T$, β1T, α2T, β2T, ..., αiT, βiT, ..., αmT, βmT, η2T, irradiates a recording beam of a recording power Pwi within the time span of αiT (1≦i≦m), and irradiates a recording beam of a bias power Pbi meeting the requirements of Pbi<Pwi and Pbi<Pwi+1 within the time span of βiT(1≦i≦m), and (ii), depending on n of time length nT of the above-mentioned recording mark, renders m, αi, βi, η1, η2, Pwi and Pbi variable, sets the number of division of the pulse m at 2 or more for the time length of at least one recording mark, and sets the time length of all the recording marks at a value meeting the requirement of n/m≧1.25. It was disclosed that this fifth prior art enables to provide an optical recording method resulting in good recording made even in the case of mark length recording at a short clock cycle suitable for a high-density recording or a high-speed recording.

SUMMARY OF THE INVENTION

According to the above-mentioned first prior art, a single recording pulse corresponds to an extension of the mark length corresponding to the detection window width. Therefore, when the detection window width has contracted, it becomes necessary to drive a semiconductor laser diode serving as the recording energy source at a speed higher than ever. For example, when an attempt is made to realize a burst transfer speed of 50 Mbytes/sec similar to that of a magnetic disk apparatus by using the general (1.7) modulation system, the detection window width for regenerative signals will be approximately 1.67 ns, and therefore the shortest recording current pulse width will be approximately 0.83 ns equivalent to approximately a half of the detection window width. However, it requires generally a time span of roughly 1 ns for a semiconductor laser to rise, and as long as the first prior art is directly used, it is difficult to generate precise recording beam pulses to realize a high-speed data transfer speed. And even if precise recording beam pulses could be realized, in the case of carrying out multi-pulse recording on a medium on which the formation of marks is controlled by the cooling speed of the heating part such as a phase-change disk, the following optical pulse is irradiated before the heated part is not sufficiently cooled down, and as a result the recording medium is not only cooled down sufficiently but the cooling speed is insufficient, and as a result it becomes impossible to form precise marks. In addition, for example, when an attempt is made to realize a burst transfer speed of 50 Mbytes/sec similar to that of a magnetic disk apparatus by using the general (1.7) modulation system, the cooling time of the recording medium will be approximately 0.83 ns equivalent to the shortest recording current pulse width, and as a result it will be completely impossible to form marks due to the characteristics of the recording medium, and this is a problem. And when we pay attention to the formation of the tail part of marks on a direct overwrite recording medium on which marks can be overwritten particularly without being preceded by any erasing operation of the marks, after the heating of the tail part of the mark has ended, the erasure and heating for preheating of the following position start before the light spot leaves completely from the tail part of the mark resulting in the erasure of the tail part of the mark, which also constituted a problem. These problems mean an increase in regenerative signal jitters, and that no rise in the information transfer speed by any improvement in recording linear density at the time of recording information can be realized.

In the second prior art described above, no consideration has been given to the thermal balance among the recording pulses corresponding to each element, and as the recording linear density is increased, problems occur on the control of the mark edge position and the control of mark width. In other words, when an attempt is made to form a mark corresponding to a single recording signal, due to a difference in the amount of accumulated heat in the recording film between the top part of the recording data and the tail part of the recording data, the recording mark width changes depending on the position, and it becomes impossible to make any precise edge recording. Or around the position of switching the type of recording pulses constituting elements within the recording of marks corresponding to a single signal, the heating peak temperature or cooling time of the recording film become uneven, and as a result the recording mark width changes constituting a problem. These problems mean an increase in the regenerative signal jitters, and that no improvement in information transfer speed can be realized at the time of recording information by any improvement in recording linear density.

According to the third prior art mentioned above, there is a case wherein pulses considerably shorter than the detection window width are inserted into the recording waveform near the central part of the mark-forming period and the heating peak temperature and the cooling period of the recording medium in its vicinity are distinctly different from the nearby part. As a result, the mark width in that part changes remarkably in comparison with the other parts. Or the precise driving of the light source becomes difficult at this part, as a result of an unexpected irradiation of the recording medium with recording pulses, the mark width in the part varies remarkably from the other parts. According to the description of this prior art, when a mark edge recording is undertaken, any variation in the signal width at the central part of the mark does not constitute a major problem provided that the edge position of the mark remains precise. However, in the case of a recording reproduction apparatus wherein the mean level of the regenerative signals is detected to determine the recording and reproduction conditions, such a distortion of the regenerative signals may give rise to an adverse effect on the operation of the apparatus. For example, in the case of a phase change recording medium, signals can be detected by a change in the reflection ratio like a phase bit-type recording medium. Accordingly, the phase-change recording medium has an advantage in that it is easy to use in common the phase bit-type recording medium and the reproduction device. However, as the regenerative signals of a phase bit-type recording medium are free of the above-mentioned distortion, it will be difficult to reproduce by using an apparatus of the same type as the one for the phase bit-type recording medium. And while the recording power condition and the reference level at the time of detection of the regenerative signals of the information recording apparatus are generally optimized by using the mean level of the regenerative signals, such a distortion of the regenerative signals was problematical in that it gives an unexpected offset to the mean level of regenerative signals, obstructs consequently any improvement in recording linear density, and damages the reliability of the information recording apparatus.

According to the fourth prior art described above, the interval between the timing of optional rise and fall of the injected energy pulses was expanded during the mark-forming period, and the initial objects of reducing frequency of the driving current of the recording light source and of securing the cooling time of the recording medium can certainly be realized. However, in the even double length mark series of Tw ((c), (e), (g), (i) of FIG. 5 in the specification of the fourth prior art) and the odd double length mark series of Tw ((d), (f), (h) of FIG. 5 in the specification of the fourth prior art), due to the common characteristic in each series, the top part of the mark forming period takes the same recording waveform. In the fourth prior art, it is apparent from the philosophy of constituting the recording waveform that the top part of the mark forming period in the even double length mark series of Tw forms the mark part of a length corresponding to 2Tw, that the top part of the mark forming period in the odd double length mark series of Tw forms the mark part of a length corresponding to 3Tw, and that in any case the mark part of a length corresponding to 2Tw is successively added for each positive pulse of the intermediate part of the mark forming period. However, even if the same even double length mark series is taken, an important difference exists between the time of forming the shortest 2Tw form and the other case in terms of what gives the dominant impact on the mark part formed by the recording waveform of the top part of the mark-forming period, whether it is the succeeding part of mark non-forming period (the case of recording waveform of its own mark not involving the intermediate part of mark-forming period) or the succeeding intermediate part of mark-forming period.(the case of recording waveform of its own mark involving the intermediate part of mark-forming period). Therefore, when the recording waveform of the common top part of mark-forming period is applied to the even double length mark series, the temperature profile at the time of forming the top part of mark-forming period changes depending on whether the mark length is the shortest or not and as a result the form of the top part of the mark-forming period changes. In other words, the edge shift of the top part of the mark-forming period ceases to be uniform depending on the mark length, the jitter at the leading edge part of the regenerative signal grows larger. Consequently, there was a problem in that the error ratio at the time of information reproduction cannot be lowered, and that it is difficult to improve recording linear density.

According to the fifth prior art, the recording waveform at the top part of mark forming period differed depending on whether the recording waveform of its mark involves the intermediate part of marking forming period or the tail part of mark forming period or not, and even if either the intermediate part of mark forming period or the tail part of mark forming period is involved, the recording waveform at the top part of mark forming period differed depending on whether the mark length is the even double length of the detection window width Tw or the odd double length of the same, and the presence or absence of impact of the intermediate part of mark-forming period pointed out in the fourth prior art mentioned above can be compensated by the design of the recording waveform at the top part of mark-forming period. However, according to the fifth prior art, among the range of mark length that can be adopted, only the case of the shortest mark length includes no recording waveform portion corresponding to the intermediate part of mark-forming period and the tail part of mark-forming period and continues directly to the mark non-forming period. Consequently, in the case of a recording mark that involves the intermediate part of mark-forming period or the tail part of mark-forming period following the top part of mark-forming period as a recording waveform, there exists a case wherein a pulse considerably shorter than the detection window width in the mark-forming period is inserted in the recording waveform, and as the heating peak temperature and the length of cooling time of the recording medium in the vicinity is remarkably different from the situation near-by, only the mark width in the pertinent part changes sharply in comparison with the other parts. Or, as it is difficult to drive precisely light source in this part and unexpected recording pulses are irradiated on the recording medium, the mark width in the relevant part may vary sharply in comparison with other parts or the mark edge position itself may be displaced considerably from the desired position on the recording medium. And in the case of using mark length modulation recording, in a recording and reproduction apparatus wherein the mean level of regenerative signals is detected to determine the recording and reproduction conditions, such a distortion of the regenerative signals may give rise to adverse impacts on the operation of the apparatus. For example, in the case of a phase change recording medium, signals can be detected by changes in the reflection ratio like the phase bit-type recording medium. As a result, the phase change recording medium has an advantage in that a same reproduction device can be used in common with the phase bit-type recording medium. However, as the regenerative signals from a phase bit-type recording medium are free of the distortion mentioned above, it will be difficult to reproduce by an apparatus of the same type as the phase bit-type recording medium. And as the recording power conditions and the reference level at the time of detection of the regenerative signals from the information recording apparatus are generally optimized by using the mean level of the regenerative signals, the distortion of such regenerative signals is problematical in that it causes an unexpected offset to the mean level of the regenerative signals, obstructs any improvement in recording linear density as a result and damages the reliability of the information recording apparatus.

As described above, the various prior arts described above are not effective to form marks with a sufficient precision at a high transfer speed, and as a result we could not realize a sufficient recording surface density and reliability.

To form marks stably and to realize a highly reliable recording and reproduction, it is necessary to choose a recording waveform that creates none of the problems mentioned above. The conditions required of such a recording waveform include the following two points in addition to the possibility of forming a highly precise form. Specifically, the first condition is that the semiconductor laser serving as the beam source must be easy to drive, and secondly a sufficient cooling time must be secured for the recording medium.

Therefore, the information recording apparatus of the present invention is an information recording apparatus for recording information by forming marks of a different physical property from the unrecorded part by injecting energy into the recording medium including an encoder for converting information into a recording data sequence, a discriminator for discriminating marks natural number k times longer of the unit L of pitch of variation in symbol length by the quotient d and the remainder r obtained by dividing k by an integer constant n of 2 or more with reference to the mark length in the recording data sequence, an energy generator for generating the energy required for recording, and a driver for driving the energy generator so that the shortest time interval between the points of change of the injected energy ratio per unit time during the mark forming period may be not shorter than ½ of the time corresponding to the symbol length L according to the result of discrimination by the discriminator, wherein the discriminator controls the energy generator so that the top part of mark-forming period may be the mutually different waveform of the mark-forming period chosen by r of the top part of mark-forming period according to the remainder r obtained by dividing k+p of the mark length k*L (a≦k≦a+n−1) for the marks whose mark-forming target length is a*L or more and (a+n−1)*L or more and b*L or less by taking the range that the mark length can take and by taking p as an optional integer constant, and for marks of which the mark-forming target length is (a+n)*L or more and b*L or less, the discriminator controls the energy generator so that, according to the quotient d obtained by and the remainder r remaining after dividing k+p of the mark length k*L(a−n≦k≦b) by n, following mutually different n number of top part of mark-forming periods chosen by r, the mark-forming period target length may have the succeeding tail part of mark forming period made of succession of d−1 times of positive pulses according to a recording pulse having a time cycle corresponding to the length n*L on the recording medium, and the waveform of the top part of mark-forming periods for the same remainder r is respectively different between the case where the mark-forming period target length is a*L or more and (a+n−1)*L and the case where the mark-forming period target length is (a+n)*L or more and b*L or less.

The information recording apparatus according to an aspect of the present invention includes an encoder for converting information into recording data sequence, a recording waveform generating circuit for generating recording waveforms from the recording data sequence outputted by the encoder, and a laser driving circuit for driving the laser beam source according to the recording waveform outputted by the laser beam source and the recording waveform generating circuit, wherein the recording waveform generating circuit generates recording waveforms whose mark-forming period is constituted by a single pulse of mutually different forms for mark 2Tw long and marks 3Tw long when the detection window width is represented by Tw, wherein the pulse of a mark 2Tw long and the top pulse of a mark 4Tw long have mutually different forms and the pulse of a mark 3Tw long and the top pulse of a mark 5Tw long have mutually different forms.

And the information recording apparatus according to another aspect of the present invention includes an encoder for converting information into recording data sequence, a recording waveform generating circuit for generating recording waveforms from the recording data sequence outputted by an encoder, a laser beam source and a laser driving circuit for driving the laser beam source according to the recording waveform outputted by the recording waveform generating circuit, wherein the recording waveform generating circuit generates recording waveforms constituted by a single top pulse of mutually different forms for marks 3Tw long, marks 4 T long and marks 5Tw when the detection window width is represented by Tw, and generates recording waveforms constituted by a single top pulse of mutually different forms and the succeeding single pulse of the same form for their respective mark forming period for marks 6Tw long, marks 7 T long and marks 8Tw wherein the pulse of a mark 3Tw long and the top pulse of a mark 6Tw long have mutually different forms, the pulse of a mark 4Tw long and the top pulse of a mark 6Tw long have mutually different forms and the pulse of a mark 5Tw long and the top pulse of a mark 7Tw long have mutually different forms.

As the configurations described above enable to secure sufficient cooling time of the recording medium during the formation of a mark or to reduce the frequency spectrum of the laser driving current, it is possible to form marks with a sufficient precision even during a high transfer speed operation, and in addition as it is possible to reduce the regenerative signal jitters resulting from the non-uniform edge shift of the top part of recording marks, it will be possible to realize a sufficient recording surface density and reliability.

According to an embodiment of the present invention, it is possible to form high-precision marks at a high speed. And this enables to use the mark edge recording method advantageous for a shift to high recording linear density as a recording method. As this leads to the realization of a higher speed and higher reliability of recording/reproduction operations, and the miniaturization of information recording apparatuses and recording media, this will be advantageous in terms of the cost of apparatuses.

DETAILED DESCRIPTION OF THE PREFERRED EMBODIMENTS

We will describe below the embodiments of the present invention. We will take up hereafter a magneto-optical recording medium as the recording medium for our description. However, this does not specifically limit the type of recording medium, and this is a common technology even to recording media on which information is recorded by forming marks of different physical characteristics from the unrecorded part by injecting energy on the recording medium (for example, dye-type recording medium and phase change-type recording medium, etc.).

In the following embodiments, the level of recording energy means the average energy level over a period of approximately a half of the detection window width (time corresponding to the unit of pitch of change in the target mark length on the recording medium, and time corresponding to the unit of pitch of change at the target edge position of marks and spaces), and if for some reason (for example, for the purpose of suppressing laser noises at the time of recording) a frequency spectrum sufficiently higher than the frequency of the cycle corresponding to the detection window width is superposed on the recording waveform, it means the mean energy level over a period an integer times of the cycle of the frequency spectrum.

Figure 1:
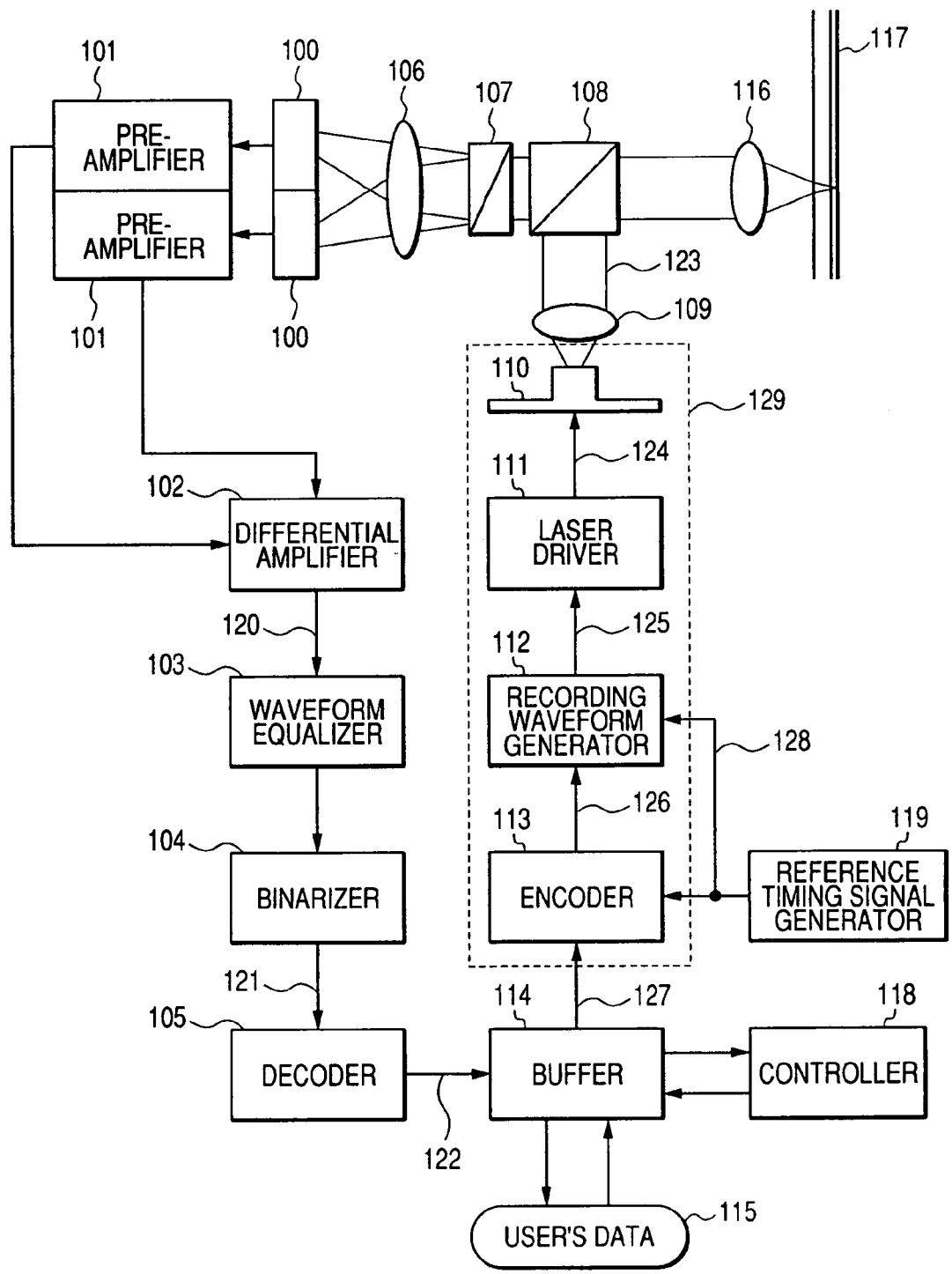
FIG. 1 is an illustration showing the whole configuration of an information recording apparatus according to an embodiment of the present invention.

FIG. 1 is a block diagram describing an example of the overall configuration of the information recording apparatus according to an embodiment of the present invention. The user data to be recorded 115 is controlled by the controller 118, and is stored momentarily in a buffer 114 until they teach a predetermined volume. The recording data 127 having reached the predetermined volume and outputted from the buffer 114 are converted into a recording data sequence 126 corresponding to the mark (not shown) arrangement formed on the magneto-optical recording medium 117 in the encoder 113. The recording data sequence 126 is transmitted to the recording waveform generating circuit 112, where it will be converted into a level generation signal 125 corresponding to the recording waveform. The encoder 113 and the recording waveform generating circuit 112 operate synchronizing with the reference time signals 128 generated by the reference time generator 119. The laser driving circuit 111 generates the laser driving current 124 by referring to the level generation signals 125, and make the laser 110 which is the source of recording energy to emit beam according to the predetermined recording waveform. The laser beam 123 emitted by the laser 110 is focused on the magneto-optical recording medium 117 by passing through the collimate lens 108, the half-mirror 108 and the objective lens 116, heats the recording film (not shown) to form marks.

At the time of reproduction of information, the sequence of marks on the magneto-optical recording medium 117 is scanned with a laser beam 123 of a low energy level that does not destroy the marks. The beam reflected by the magneto-optical recording medium 117 is irradiated onto a polarized beam splitter 107 passing through the objective lens 116 and the half mirror 108. The polarized beam splitter 107 separates the reflected beam whose polarization plane has rotated according to the direction of magnetization of marks into polarized beams mutually orthogonal, each of which is led onto a light detector 100 through a detection lens 106. The light detector 106 transforms the intensity of mutually orthogonal polarized beams into electric signals proportional thereto. The electric signals are amplified by a preamplifier 101 installed in each optical detector 100 to be transmitted to a differential amplifier 102. The differential amplifier 102 computes the difference between the input signals and creates magneto-optical regenerative signals 120 corresponding to the presence or not of marks at the scanning position on the magneto-optical recording medium 117. The magneto-optical regenerative signals 120 are processed for the equalization of waveform by a waveform equalizer 103, and are then converted into binarized regenerative signals 121 by a binarizer 104. Then, a decoder 105 carries out an inverse transformation of the encoder 113 on these binarized regenerative signals 121 and stores the reproduction data 122 in the buffer 114. The reproduction data 122 stored in the buffer 114 are controlled by the controller 118, and upon reaching a predetermined volume, they are outputted as the finally reproduced user data 115 out of the apparatus.

Figure 2:
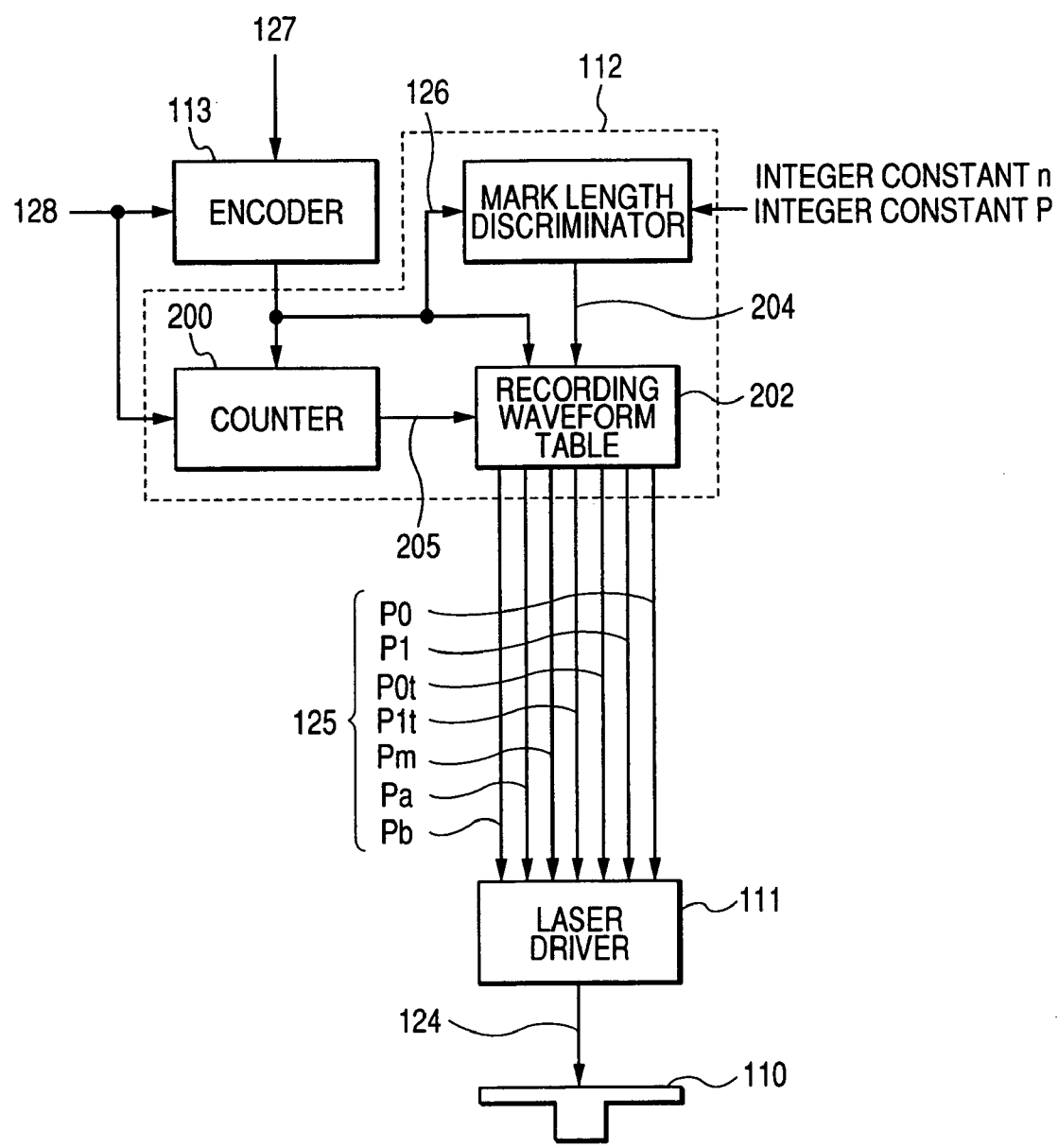
FIG. 2 is an illustration describing the configuration of a recording processing system according to an embodiment of the present invention.

FIG. 2 is an illustration describing in details an example of the configuration of the recording processing system 129 in FIG. 1. Recording data 127 are transformed in the encoder 113 into recording data sequence 126 representing information on mark length, space length and their top position. The recording data sequence 126 is transmitted to the mark length discriminator 201 and the recording waveform table 202. The mark length discriminator 201 divides the value obtained by adding the predetermined integer constant p to the mark length (expressed by the unit of pitch of variation in the length of symbols) of the recording data sequence 126 by two or more the predetermined integer constants n and inputs the quotient d obtained thereby and the remainder r remaining as a result of the computation into the recording waveform table 202 as mark length discrimination signals 204. On the other hand, the counter 200 refers the recording data sequence 126 and measures time from the top position of the mark using the reference time signal 128 as the unit to form count signals 205. The recording waveform table transmits the level generation signals 125 reflecting the predetermined recording waveforms (P0 generation signals, P1 generation signals, P0t generation signals, P1t generation signals, Pm generation signals, Pa generation signals and Pb generation signals) to the laser driving circuit 111. The laser driving circuit 111 composes the laser driving current 124 by referring these level generation signals 125, and drives the laser 110 constituting the recording energy source.

Figure 3:
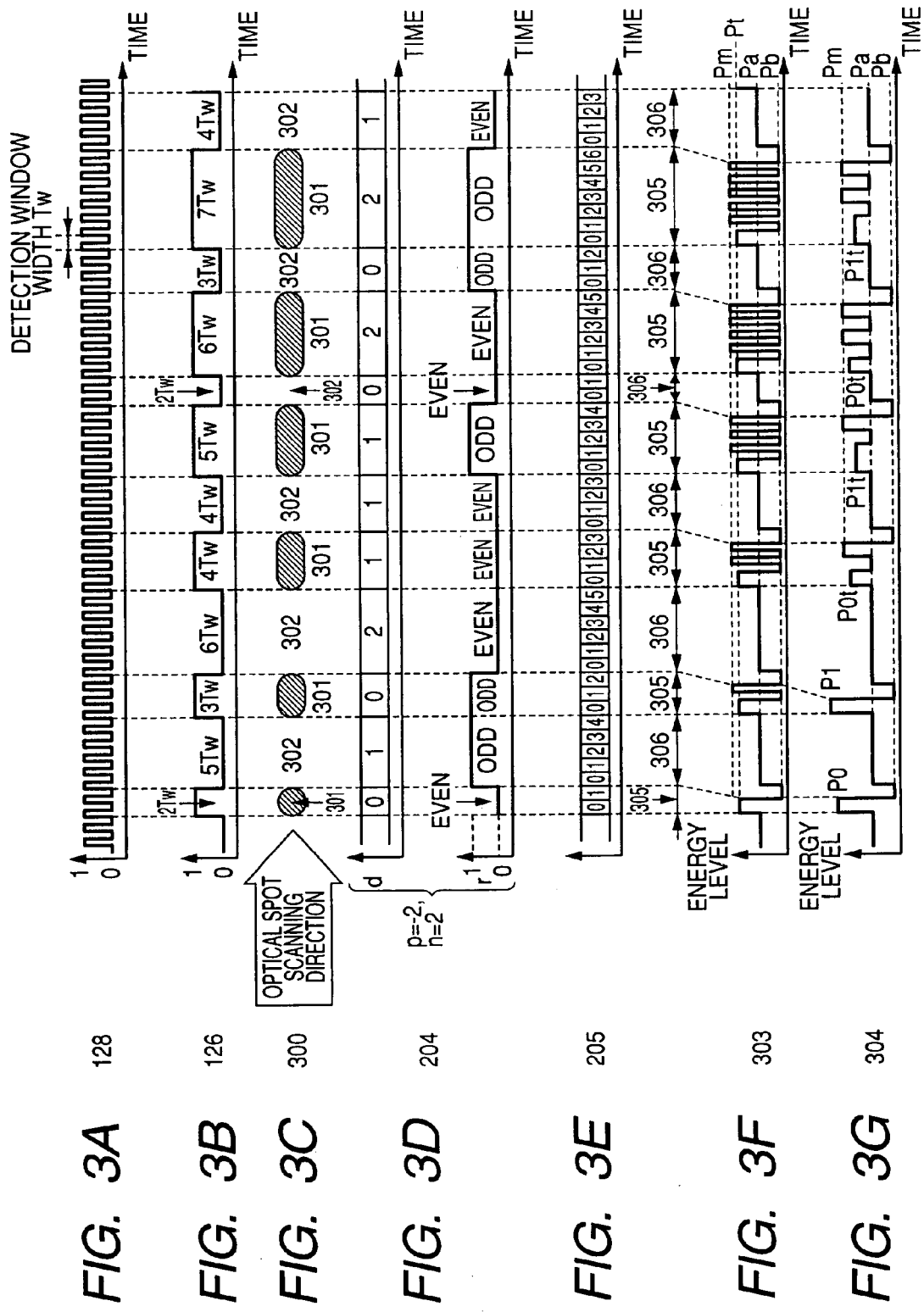
FIG. 3 is an illustration describing the operation of a recording processing system according to an embodiment of the present invention and the prior art.

First Embodiment (a)-(g) in FIG. 3 is a set of illustrations describing the operation of recording processing systems according to an embodiment of the present invention and the prior art by using an example of mark spaces of recording data sequence and the operation of generation recording waveforms for recording the same in the conventional apparatus and the apparatus according to an embodiment of the present invention. Incidentally, the following description of recording waveforms compares the recording waveforms in the case where the recording waveform is determined during the mark-forming period only by its own mark length. In other words, the following description of waveforms compares the recording wave-forms when no additional technology that makes fine adjustment of the length or level of certain distance of the recording waveform by referring the preceding and succeeding recording patterns and the like or when the recording patterns are the same for a sufficiently long distance before and after the mark to be formed. Here a sufficiently long distance means a distance sufficiently longer than the distance on the medium affected by the injection of recording energy for a period equivalent to the detection window width.

(a) in FIG. 3 is an illustration showing the reference time signal 128 constituting the reference time for recording operation, and its cycle is Tw. (b) in FIG. 3 illustrates the recording data sequence 126 resulting from the transformation of the recording data by the encoder 113. Here, Tw represents the detection window width constituting the minimum unit of variation in the length of marks and length of space in the recording data sequence 126, or a length of time corresponding to the unit of pitch of variation in the length of symbols. In this sample, the range within which the length of symbols can vary is, as described below, a length corresponding to 2Tw or more and 8Tw or less. (c) in FIG. 3 shows an image of the arrangement of marks on the recording medium, and the laser beam spot for recording and reproduction runs from the left to the right in (c) of FIG. 3. The marks 301 correspond one-to-one with level "1" in the recording data sequence 126, and are formed keeping the length proportional to the period as the target.

(d) in FIG. 3 shows the mark length discrimination signals 204 for the apparatus of the present invention, and the mark length discrimination signal 204 in this case is constituted by the quotient d obtained and the remainder r remaining after a division after adding the integer constant p(p=−2) to the mark length expressed by the units of the detection window width Tw. Here, n is a parameter that should be determined at the time of designing the apparatus, and controls the cooling time of the recording medium and the suppressing degree of frequency spectrum width of the driving current waveform. Although we have adopted n=2 here, this does not limit the divisor serving as the criteria of discrimination of mark length, and two or more other integer divisors may be used. The letter "p" is a parameter for adjusting the number of positive pulses in the succeeding part of mark-forming period, and this should be chosen as considered appropriate depending on the characteristics, the recording linear density and the like of the recording medium. By the parameters described above, in this example, the mark length is discriminated by the unit of 2Tw, and the mark length is discriminated between the case of even double length and that of odd double length. (e) in FIG. 3 shows the count signal 205 for the present invention, and measures the time from the top of the mark 301 or the space 302 by the unit of Tw.

(f) and (g) in FIG. 3 represent respectively examples of recording waveform for the conventional apparatus and the apparatus according to an embodiment of the present invention corresponding to the recording data sequence 126 shown in (b) of FIG. 3. These recording waveforms 303 and 304 are formed by referring to the count signal 205 and the recording data sequence 126. And in the apparatus according to an embodiment of the present invention, in addition to the signals mentioned above, the mark length discrimination signal 204 is also referred to. In other words, according to the case of recording waveform 303 for the conventional apparatus, the top part pulse with an injection energy level Pt and length 1Tw is generated at the top part of mark-forming period 407, and with regards to the marks mTw(m≧3) long, a pulse constituted by a period having an injection energy level Pb and a length 0.5Tw and a period having an injection energy level Pm and a length 0.5Tw is generated repeatedly m−2 times in the immediately succeeding part. Immediately after the end of the mark-forming period 305, a period having an injection energy level Pb and a length 1Tw is succeeded by a period having an injection energy level Pa that continues until the beginning of the succeeding mark-forming period.

Incidentally, the top part of mark-forming period referred to in the present specification is the part for injecting energy for forming the top part of mark in a mark-forming period. The succeeding part of mark-forming period is the part remaining after removing the top part of mark-forming period from a mark-forming period, is formed by the repetition of pulses of a certain cycle and a certain amplitude generally reflecting the mark length and is a part for injecting the energy for forming the part subsequent to the top part of mark into the recording medium. A recording waveform is generally constituted by the top part of mark-forming period and the succeeding part of mark-forming period. According to the recording waveform for the conventional apparatus of this example, the pulse length and the pulse width of the top part of mark-forming period is common regardless of the mark length.

On the other hand, in the case of recording waveform 304 referred to in the present specification, the pulse for the top part of mark-forming period is formed as described below taking −2 as the integer constant p.
(1) In the case of quotient d=0 obtained by dividing the value obtained by adding n=−2 to the mark length expressed by the unit of pitch of change in the symbol length by n=2,
   (1a) In the case of the remainder r=0 . . . the injection energy level=P0, period=1Tw
   (1b) In the case of the remainder r=1 . . . the injection energy level=P1, period=1Tw
(2) In the case of quotient d=1 or more obtained by dividing the value obtained by adding n=−2 to the mark length expressed by the unit of pitch of change in the symbol length by n=2,
   (2a) In the case of the remainder r=0 . . . the injection energy level=P0t, period=1Tw
   (2b) In the case of the remainder r=1 . . . the injection energy level=P1t, period=1Tw Depending on whether d=0 or otherwise, the waveform at the top of mark-forming period is switched from one to the other. This is, as mentioned above, in order to compensate the difference in the impact of the immediately succeeding recording waveform to the top part of mark-forming period.

In the case of the recording waveform 304 for the apparatus according to an embodiment of the present invention, the pulse at the succeeding part of mark-forming period 408 within the mark-forming period is generated as described below:
(1) In the case of quotient d=0 obtained by dividing the value obtained by adding n=−2 to the mark length expressed by the unit of pitch of change in the symbol length by n=2, . . . no pulse is generated.
(2) In the case of quotient d=1 or more obtained by dividing the value obtained by adding n=−2 to the mark length expressed by the unit of pitch of change in the symbol length by n=2, . . . the combination of an injection energy level Pa and a period=1Tw and an injection energy level Pm and a period=1Tw is repeated four times.

From the above description, the mark length per cycle of recording wave-form in the succeeding part of mark-forming period including the combination of an injection energy level Pm and a period=1Tw is extended by a length corresponding to 2Tw. Immediately after the end of the mark-forming period, a period having an injection energy level Pb and a length 1Tw is followed by another period having an injection energy level Pa lasting until the beginning of the subsequent mark-forming period.

From the above description, the shortest cycle of the recording waveform pulse for the apparatus according to an embodiment of the present invention is 2Tw while that of the conventional apparatus is Tw, and the shortest cooling time in the example of recording waveform 304 for the apparatus according to an embodiment of the present invention (the shortest length of time from a fall in the recording waveform to the subsequent rise) and the shortest positive pulse time length (the shortest length of time from a rise in the recording waveform to the subsequent fall) is set at twice the example of recording waveform 303 for the conventional apparatus. In other words, in the information recording apparatus according to an embodiment of the present invention, the frequency spectrum width of the laser driving current 124 for laser 110 serving as the means of generating energy is suppressed to approximately a half, and assuming that the frequency spectrum width (change ratio of the driving current per hour) of the laser driving current 124 is the same, it will be possible to form marks with such a high precision corresponding to up to twice the recording linear speed of the conventional apparatus. This will enable to adopt the mark edge recording method advantageous for the attainment of a high recording linear density as a recording method. In this way, a high speed and a high reliability can be can be achieved in recording and reproduction operations, and at the same time information recording apparatuses and recording media can be made more compact representing an advantage in terms of the apparatus cost.

Figure 4:
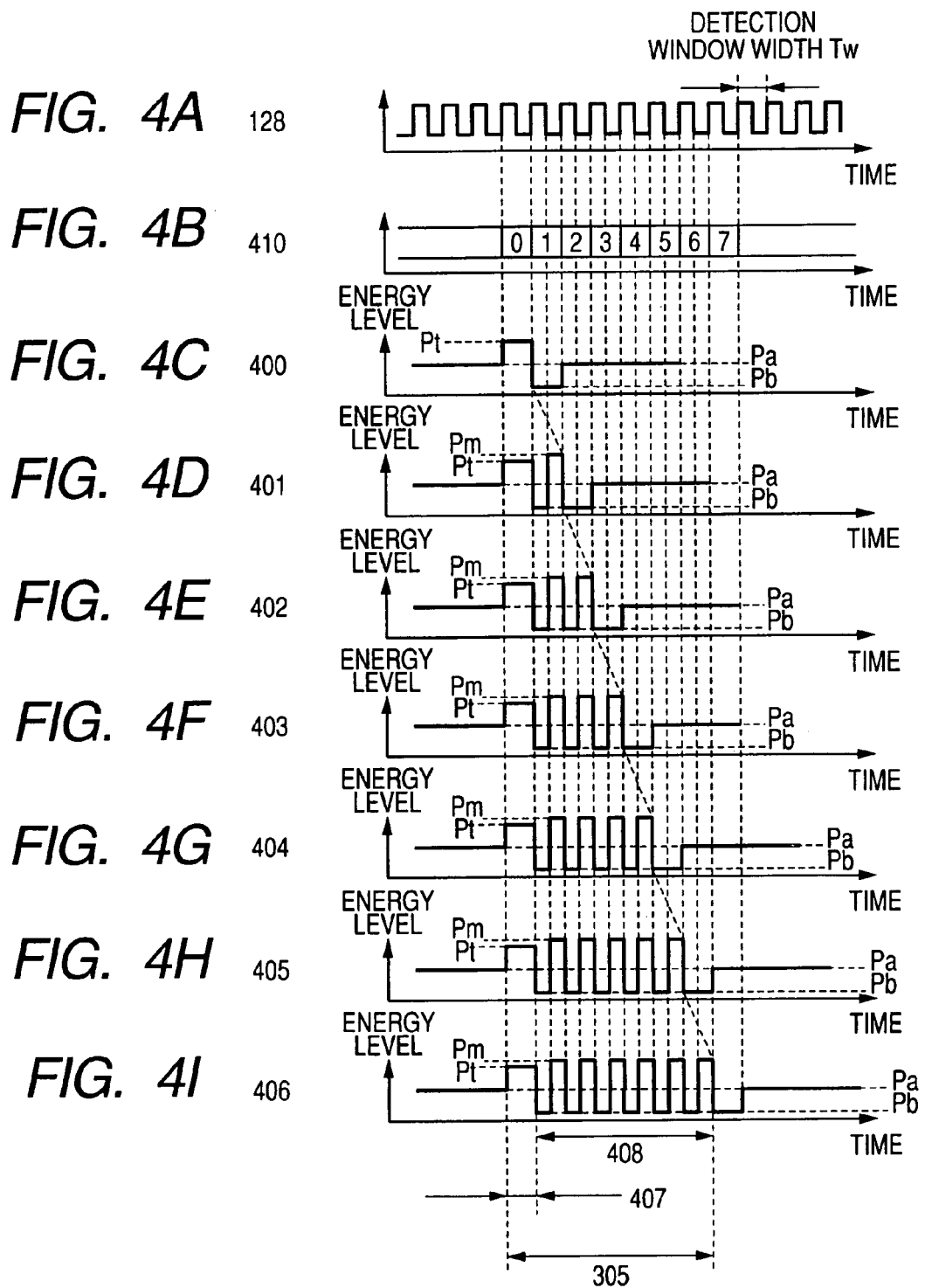
FIG. 4 is an illustration describing the examples of recording waveforms of the recording processing system according to the prior art.

Then, we will show again in (a)-(i) of FIG. 4 the examples of recording waveforms 400-406 for the conventional apparatuses. The examples of recording waveforms shown in (a)-(i) in FIG. 4 are the result of our efforts to put the examples of recording waveforms 303 for the conventional apparatus shown in (f) of FIG. 3 for each mark length in order. For example, we assume that the rule of encoding by the encoder 113 is that the modulation of (1-7) codes is followed by the NRZI modulation. Therefore, the symbol length is always 2Tw or more and 8Tw or less.

(a) in FIG. 4 shows the reference time signal 128, and each element of the recording processing system 129 operates according to this. (b) in FIG. 4 shows count signals, and measures the length of time from the mark top by the unit of the detection window width Tw. The timing for the count signals to shift to zero (0) correlates with the top of marks or spaces. (c) in FIG. 4 represents the recording waveform at the time of forming marks 2Tw long, and the mark-forming period 305 includes pulses 1Tw long and Pt high. The mark non-forming period is headed by a period 1Tw long and Pb high and then keeps a level Pa until the subsequent mark-forming period. (d) in FIG. 4 shows the recording waveform at the time of forming a mark 3Tw long, and the mark-forming period 305, like (c) in FIG. 4, begins with a pulse 1Tw long and Pt high and is followed by a period 0.5Tw long and Pb high and another period 0.5Tw long and Pm high. (e)-(i) in FIG. 4 shows respectively recording waveforms at the time of forming marks 4Tw-8Tw long, and for each mark length 1Tw, a period 0.5Tw long and Pb high and a period 0.5Tw long and Pm high are successively added to the tail end of the mark-forming period. Mark non-forming period, not resorting to space length, begins with a period 1Tw long and Pb high and keeps a level Pa until the subsequent mark-forming period. In this example of recording waveform, the shortest cooling period in the mark-forming period 305 is 0.5Tw.

Figure 5:
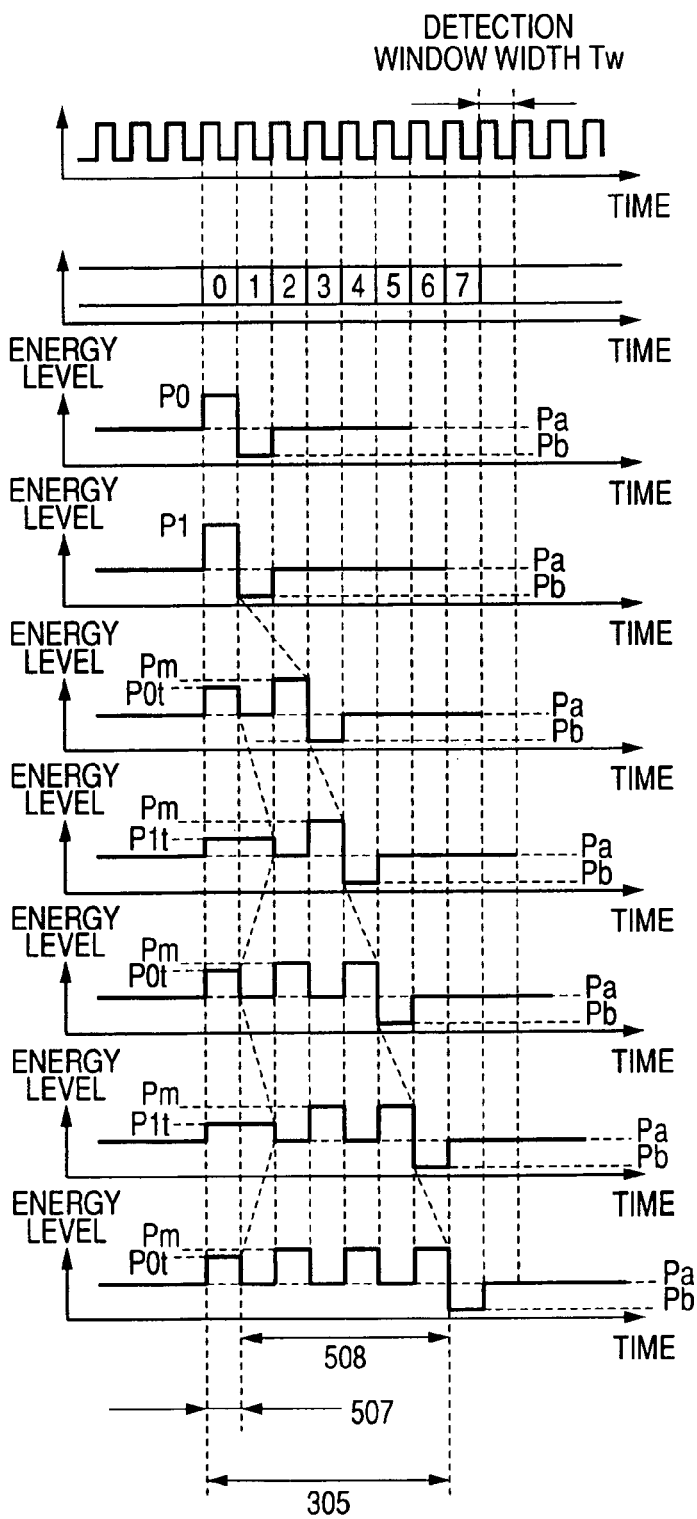
FIG. 5 is an illustration describing the examples of recording waveforms of the recording processing system according to an embodiment of the present invention.

Then, in order to describe the operation of the recording waveform generating circuit 112 shown in FIG. 2, we will show examples 500-506 of recording waveforms in the apparatus according to an embodiment of the present invention with reference to (a)-(i) in FIG. 5. The examples of recording waveforms shown in (a)-(i) of FIG. 5 are the result of our efforts to put in order the examples of recording waveforms 304 for the apparatus according to an embodiment of the present invention shown in (g) of FIG. 3.

The encoding rule of the encoder 113 is, like (a)-(i) in FIG. 4, that the modulation of codes (1.7) is followed by the implementation of NRZI modulations. Therefore, the symbol length is always 2Tw or more and 8Tw or less. However, this does not limit the encoding rule of the encoder 113. The present invention can be applied to any encoder 113 having an optional encoding rule (for example, Eight-to-Fourteen Modulation and the like) instead of limiting-the encoding rules of the encoder 111. And in this example, the operation of the mark length discriminator 201 shown in FIG. 2 is division (computation of quotients and remainder) by a fixed divisor n=2. and the mark length discrimination signal includes the quotient d (not shown) obtained by and the remainder r (not shown) remaining after adding an integer constant p (p=−2) to the mark length expressed by the unit of the detection window width Tw and dividing the result by a fixed divisor n=2. In other words, in the present example, the mark length is discriminated by the unit of 2Tw and at the same time the mark length is discriminated into the case of odd double length and the case of even double length of Tw. However, although we have chosen here the constant n=2 for the divisor for the purpose of simplification, this does not limit the divisor serving as the criteria of discriminating the mark length, and any other integer divisor of n=3 or more may be used. And this principle applies also to the integer constant p.

(b) in FIG. 5 represents the count signals 205 generated by the counter 200, and the length of time from the mark top is measured by the unit of the detection window width Tw. The timing for the count signal to shift to zero (0) correlates with the top of marks or spaces. (c) in FIG. 5 shows the recording waveforms at the time of forming marks 2Tw long, and the mark-forming period 305 include pulses 1Tw long and P0 high. (e) in FIG. 5 represents the recording waveforms at the time of forming marks 2Tw long, and the mark-forming period 305 begins with a pulse 1Tw long and P0t high followed by a period 1Tw long and Pa high and another period 1Tw long and Pm high. Thereafter, as shown in (g) and (i) of FIG. 5, in the case of an even double-length mark with a detection window width Tw, a period 1Tw long and Pa high for each mark length 2Tw and a period 1Tw and Pm high are successively added to the tail end of the mark-forming period.

(d) in FIG. 5 shows the recording waveform at the time of forming marks 3Tw long, and the mark-forming period 305 includes pulses 1Tw long and P1 high. (f) in FIG. 5 represents the recording waveforms at the time of forming marks 2Tw long, and the mark-forming period 305 begins with a pulse 1Tw long and P1t high followed by a period 1Tw long and Pa high and another period 1Tw long and Pm high. Thereafter, as shown in (h) of FIG. 5 in the case of an even double-length mark with a detection window width Tw, a period 1Tw long and Pa high for each mark length 2Tw and a period 1Tw and Pm high are repeatedly added to the tail end of the mark-forming period. Mark non-forming period, not resorting to space length, begins with a period 1Tw long and Pb high and then keeps a level Pa until the subsequent mark-forming period. In this example of recording waveform, the shortest cooling period in the mark-forming period 305 is 1Tw.

To recapitulate the descriptions above, according to the examples of recording waveforms 500-506 for the apparatus according to an embodiment of the present invention shown in FIG. 5, the pulse at the top of a mark-forming period is generated as described below when the integer constant p is set at zero (0).

(1) In the case of quotient d=0 obtained by dividing the value obtained by adding p=−2 to the mark length expressed by the unit of pitch of change in the symbol length by n=2,
  (1a) In the case of the remainder r=0 . . . the injection energy level=P0, period=1Tw
  (1b) In the case of the remainder r=1 . . . the injection energy level=P1, period=1Tw
(2) In the case of quotient d=1 or more obtained by dividing the value obtained by adding p=−2 to the mark length expressed by the unit of pitch of change in the symbol length by n=2,
  (2a) In the case of the remainder r=0 . . . the injection energy level=P0t, period=1Tw
  (2b) In the case of the remainder r=1 . . . the injection energy level=P1t, period=2Tw Depending on whether d=0 or otherwise, the recording waveform at the top of mark-forming period is switched from one to the other. This is, as mentioned above, in order to compensate the difference in the impact of the immediately succeeding recording waveform to the top part of mark-forming period depending on the presence or not of the succeeding part of mark-forming period. In addition, according to the example of recording waveform 304 for the apparatus according to an embodiment of the present invention, the pulses in the succeeding part of mark-forming period 508 within the mark-forming period 305 are generated as described below.

(1) In the case of quotient d=0 obtained by dividing the value obtained by adding n=−2 to the mark length expressed by the unit of pitch of change in the symbol length by n=2, . . . no pulse is generated.
(2) In the case of quotient d=1 or more obtained by dividing the value obtained by adding p=−2 to the mark length expressed by the unit of pitch of change in the symbol length by n=2, . . . the combination of an injection energy level Pa and a period=1Tw and an injection energy level Pm and a period =1Tw is repeated d times.

From the above description, the mark length per cycle of recording wave-form in the succeeding part of mark-forming period including the combination of an injection energy level Pa period=1Tw and injection energy level Pm period 1Tw is extended by a length corresponding to 2Tw for each cycle. Immediately after the end of the mark-forming period, a period having an injection energy level Pb and a length 1Tw is followed by another period having an injection energy level Pa lasting until the beginning of the subsequent mark-forming period.

From the above description, the shortest cycle of recording waveform pulse for the apparatus according to an embodiment of the present invention is 2Tw while that of the conventional apparatus is Tw, and the shortest cooling time in the example of recording waveform 304 for the apparatus according to an embodiment of the present invention and the shortest positive pulse time length is set at twice the example of recording waveform 303 for the conventional apparatus. In other words, in the information recording apparatus according to an embodiment of the present invention, the frequency spectrum width of the laser driving current 124 for laser 110 serving as the means of generating energy is suppressed to approximately a half, and assuming that the frequency spectrum width (change ratio of the driving current per unit hour) of the laser driving current 124 is the same, it will be possible as we have mentioned above to form marks with such a high precision corresponding to up to approximately twice the recording linear speed of the conventional apparatus.

And in the examples of recording waveforms 500-506 for the apparatus according to an embodiment of the present invention, we treated the case of d=0 wherein there is no succeeding part of mark-forming period 508 immediately after the top part of mark-forming period 507 in the mark-forming period 305 as a special case and we generated by switching the pulses of an injection energy level of P0 or P1 depending on the mark length. In addition, in the case where the injection of energy into the recording medium immediately after the end of the mark-forming period 305 does not affect directly the top part of mark-forming period formed by the recording pulse of the top part of mark-forming period 507, in other word in the case of d≧1 wherein the top part of marks formed by the recording pulse of the top part of mark-forming period 507 is directly affected by the recording pulse in the succeeding part of mark-forming period 508, pulses with an injection energy level of P0t(P0t≠P0) or P1t(P1t≠P1) depending on the mark length are generated as the recording pulses for the top part of mark-forming period 507, enabling thus to control very precisely mark edge positions.

As described above, the information recording apparatus according to an embodiment of the present invention enables to form high-precision marks even at the time of high-speed recording. And this enables to use the mark edge recording method advantageous for realizing high recording linear density as a recording method. As this leads to the realization of a higher speed and higher reliability of recording/reproduction operations, and the miniaturization of information recording apparatuses and recording media, this will be advantageous in terms of the cost of apparatuses.

Second Embodiment

Figure 6:
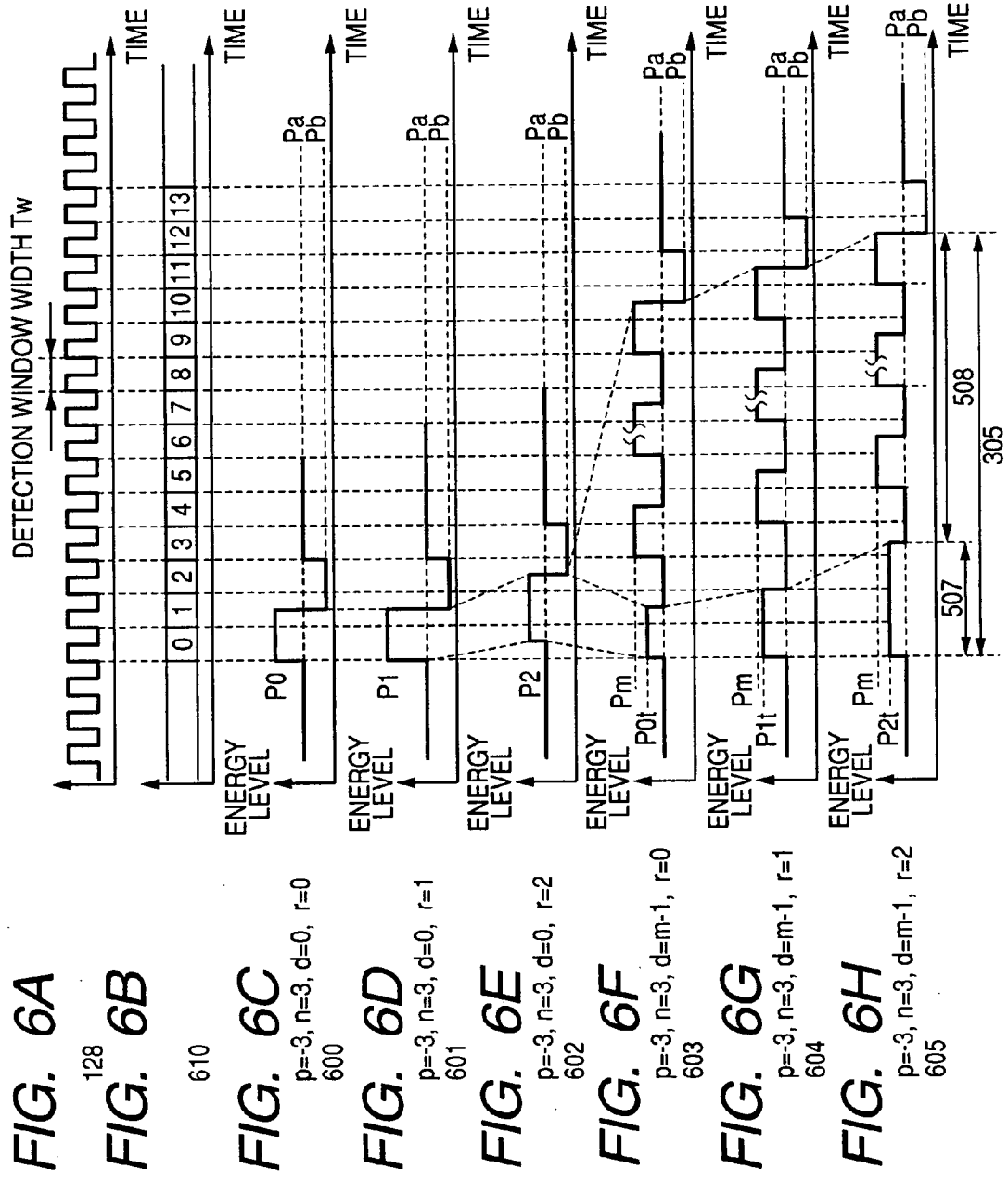
FIG. 6 is an illustration describing the other examples of recording waveforms of the recording processing system according to an embodiment of the present invention.

Then, in order to describe the operation of the recording waveform generating circuit 112 shown in FIG. 2, we will show other examples 600-605 of recording waveforms in the apparatus according to an embodiment of the present invention with reference to (a)-(h) in FIG. 6. The examples of recording waveforms shown in (a)-(h) of FIG. 6 are the result of our efforts to put in order the examples of recording waveforms for the apparatus according to an embodiment of the present invention for each mark length in the same way as in FIG. 5.

The mark length determined by the encoding rule of the encoder 113 shall be 3Tw or more. And the operation of the mark length discriminator 201 shown in FIG. 2 shall be divisions by means of a fixed divisor n=3, and the mark length discrimination signal include the quotient d obtained by and the remainder r remaining after adding the integer constant p(p=−3) to the mark length expressed by the unit of the detection window width Tw and dividing the result by the integer constant n(n=3). Here, n=3 is a parameter that should be determined at the time of designing the apparatus and controls, as mentioned above, the cooling time of the recording medium and the suppressing degree of frequency spectrum width of the waveform of the laser driving current. However, the fixed divisor n=3 given here does not limit the divisor that will be a criteria of discriminating mark length, and other integer divisors of 2 or more may be adopted. And as we have mentioned above, p is a parameter for adjusting the number of positive pulses in the succeeding part of mark-forming period, and this should be chosen as deemed appropriate depending on characteristics, the recording density of the recording medium and the like. By using the parameters mentioned above, we can discriminate mark lengths by the unit of 3Tw in this example, and we also discriminate the system of three remainders of the mark length expressed by the unit of Tw, in other words 0.1.2.

(b) in FIG. 6 shows the count signals 610 generated by the counter 200, and measures the time from the mark top by the unit of the detection window width Tw. The timing by which the count signal shift to zero (0) correlates with the top of marks or spaces. (c) in FIG. 6 shows the recording waveform at the time of forming a mark 3Tw long, and the mark-forming period 305 includes the positive pulses 1.5Tw long and an injection energy level P0. (d) in FIG. 6 shows the recording waveform at the time of forming 4Tw long, and the mark-forming period 305 includes the positive pulses 1.5Tw long and P1 (P2≠P0) high. FIG. 6(*e*) shows the recording waveform at the time of forming mark 5Tw long, and the mark-forming period 305 includes the positive pulses 2Tw long and P2 (generally P2≠P1, P2≠P0) high.

(f) in FIG. 6 shows the recording waveform at the time of forming marks 6Tw, 9Tw and 12Tw (in other words, generally 3 mTw long by taking m as a natural number), and the mark-forming period 305 begins with a positive pulse 12.5Tw long and P0t high to be followed by a d time repetition of the combination of negative pulse period 1.5Tw long and Pa high and positive pulse period 1.5Tw long and Pm high. (g) in FIG. 6 shows the recording waveform at the time of forming marks 7Tw, 10Tw, and 13Tw long (in other words, generally (3 m+2)Tw long taking m as a natural number), and the mark-forming period 305 begins with a positive pulse 2Tw long and P1t high (generally P1t≠P0t) to be followed by a d times repetition of the combination of a negative pulse period 1.5Tw long and Pa high and a positive pulse period 1.5Tw long and Pm high. FIG. 6(*h*) shows the recording waveform at the time of forming marks 8Tw, 11 w, and 14 w long (in other words, generally (3 m+2 T)w long taking m as a natural number), and the mark-forming period 305 begins with a positive pulse 3.5Tw long and P2t high (generally P2t≠P1t, P2t≠P0t) to be followed by a d times repetition of the combination of a negative pulse period 1.5Tw long and Pa high and a positive pulse period 1.5Tw long and Pm high. The mark non-forming period, without resorting to any space length, begins with a negative pulse period 1.5Tw long and Pb high and maintains thereafter a level Pa until the subsequent mark-forming period. According to the present example of recording waveform, the shortest cooling period in the mark-forming period 305 is 1.5Tw.

To recapitulate the descriptions above, according to the examples of recording waveforms 600-605 for the apparatus according to an embodiment of the present invention shown in FIG. 6, the pulse at the top of a mark-forming period is generated as described below when the integer constant p is set at p=−3.

(1) In the case of quotient d=0 obtained by dividing the value obtained by adding p=−3 to the mark length expressed by the unit of pitch of change in the symbol length by n=3,
 (1a) In the case of the remainder r=0 . . . the injection energy level=P0, period=1.5Tw
 (1b) In the case of the remainder r=1 . . . the injection energy level=P1, period=1.5Tw
 (1c) In the case of the remainder r=2 . . . the injection energy level=P2, period=2Tw
(2) In the case of quotient d=1 or more obtained by dividing the value obtained by adding p=−3 to the mark length expressed by the unit of pitch of change in the symbol length by n=3,
 (2a) In the case of the remainder r=0 . . . the injection energy level=P0t, period=1.5Tw
 (2b) In the case of the remainder r=1 . . . the injection energy level=P1t, period=2Tw
 (2b) In the case of the remainder r=2 . . . the injection energy level=P2t, period=3.5Tw Depending on whether d=0 or otherwise, the recording waveform at the top of mark-forming period 507 is switched from one to the other. This is, as mentioned above, in order to compensate the difference in the impact of the immediately succeeding recording waveform to the top part of mark-forming period 507 depending on whether the succeeding part of mark-forming period 508 exists or not. In addition, according to the examples of recording waveforms 600-605 for the apparatus according to an embodiment of the present invention, the pulses in the succeeding part of mark-forming period 508 are generated as described below.

(1) In the case of quotient d=0 obtained by dividing the value obtained by adding p=−3 to the mark length expressed by the unit of pitch of change in the symbol length by n=2, . . . no pulse is generated.
(2) In the case of quotient d=1 or more obtained by dividing the value obtained by adding p=−3 to the mark length expressed by the unit of pitch of change in the symbol length by n=3, . . . the combination of an injection energy level Pa period=1.5Tw and an injection energy level Pm period=1.5Tw is repeated d times.

From the above description, the mark length per cycle of recording waveform in the succeeding part of mark-forming period including the combination of an injection energy level Pa period=1.5Tw and an injection energy level Pn period=1.5Tw is extended by a length corresponding to 3Tw for each cycle of mark length. Immediately after the end of the mark-forming period, a period having an injection energy level Pb and a length 1.5Tw is followed by another period having an injection energy level Pa lasting until the beginning of the subsequent mark-forming period.

From the above description, the shortest cycle of recording waveform pulse for the apparatus according to an embodiment of the present invention is 3Tw while that of the conventional apparatus is Tw, and the shortest cooling time in the example of recording waveform 304 for the apparatus according to an embodiment of the present invention and the shortest positive pulse time length is set at three times the example of recording waveform 303 for the conventional apparatus. In other words, in the information recording apparatus according to an embodiment of the present invention, the frequency spectrum width of the laser driving current 124 for laser 110 serving as the means of generating energy is suppressed to approximately a third, and assuming that the frequency spectrum width of the laser driving current 124 is the same, it will be possible as we have mentioned above to form marks with such a high precision corresponding to up to approximately three times the recording linear speed of the conventional apparatus.

And in the examples of recording waveforms 600-605 for the apparatus according to an embodiment of the present invention, we treated the case of d=0 wherein there is no succeeding part of mark-forming period 508 immediately after the top part of mark-forming period 507 in the mark-forming period 305 as a special case and we generated by switching the pulses of an injection energy level of P0, P1 or P2 depending on the mark length. In addition, in the case where the injection of energy into the recording medium immediately after the end of the mark-forming period 305 does not affect directly the top part of marks formed by the recording pulse of the top part of mark-forming period 507, in other word in the case of d≧1 wherein the top part of marks formed by the recording pulse 507 of the top part of mark-forming period 507 is directly affected by the recording pulse in the succeeding part of mark-forming period 508, pulses with an injection energy level of P0t(P0t≠P0), P1t(P1t≠P1) or P2t(P2t≠P2) depending on the mark length are generated as the recording pulses for the top part of mark-forming period 507, enabling thus to control very precisely mark edge positions.

As described above, the information recording apparatus according to an embodiment of the present invention enables to form high-precision marks even at the time of high-speed recording. And this enables to use the mark edge recording method advantageous for realizing high recording linear density as a recording method. As this leads to the realization of a higher speed and higher reliability of recording/reproduction operations, and at the same time the miniaturization of information recording apparatuses and recording media, this will be advantageous in terms of the cost of apparatuses.

Third Embodiment

Figure 7:
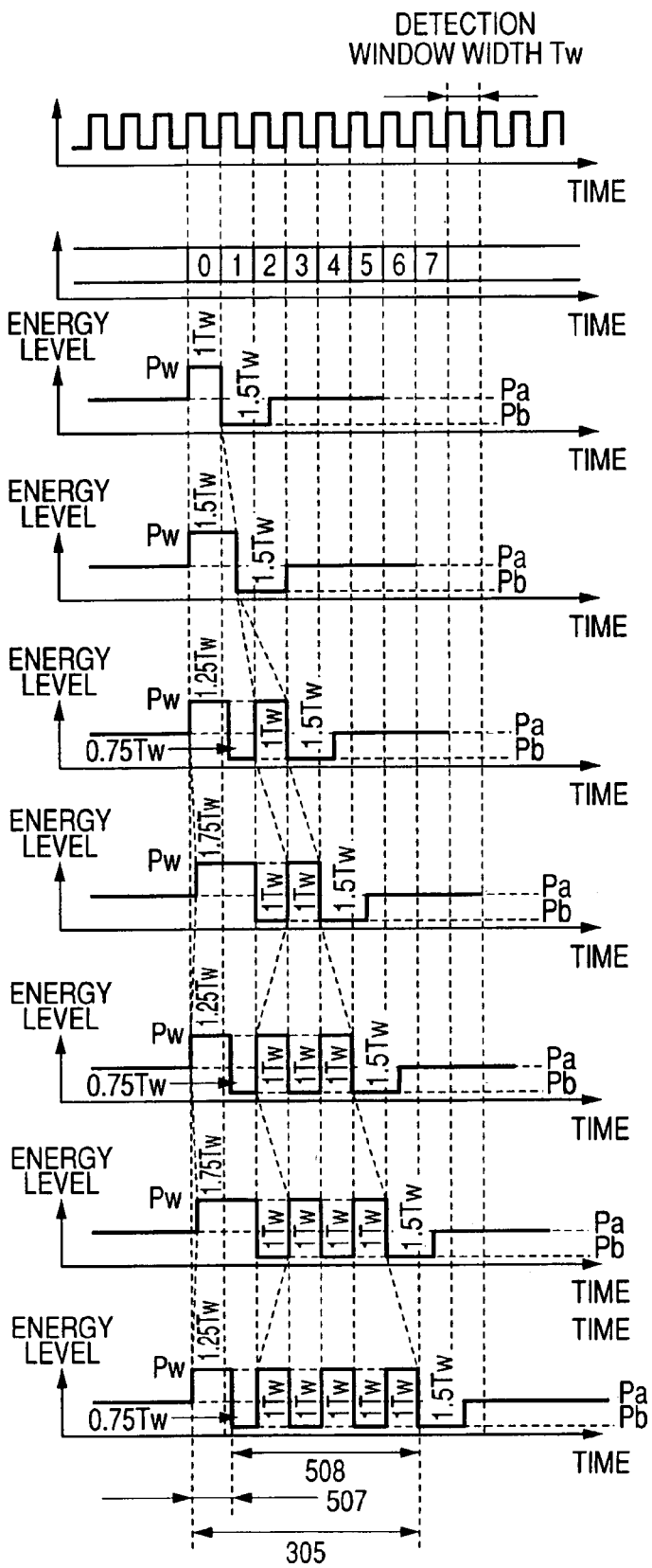
FIG. 7 is an illustration describing the further other examples of recording waveforms of the recording processing system according to an embodiment of the present invention.

Then, in order to describe the operation of the recording waveform generating circuit 112 shown in FIG. 2, we will show other examples 700-706 of recording waveforms in the apparatus according to an embodiment of the present invention with reference to (a)-(i) in FIG. 7. The examples of recording waveforms shown in (a)-(i) of FIG. 7 are the result of our efforts to put in order the recording waveforms for the apparatus according to an embodiment of the present invention in the same way as in FIG. 5.

The mark length determined by the encoding rule of the encoder 113 shall be 2Tw or more and 8Tw or less. And the operation of the mark length discriminator 201 shown in FIG. 2 shall be divisions by means of a fixed divisor n=2, and the mark length discrimination signal include the quotient d obtained by and the remainder r remaining after adding the integer constant p(p=−2) to the mark length expressed by the unit of the detection window width Tw and dividing the result by the integer constant n(n=2). Here, n=2 is a parameter that should be determined at the time of designing the apparatus and controls, as mentioned above, the cooling time of the recording medium and the suppressing degree of frequency spectrum width of the waveform of the laser driving current.

However, the fixed divisor n=2 given here does not limit the divisor that will be a criteria of discriminating mark length, and other integer divisors of 2 or more may be adopted. And as we have mentioned above, p is a parameter for adjusting the number of positive pulses in the succeeding part of mark-forming period, and this should be chosen as deemed appropriate depending on the characteristics, the recording linear density and the like of the recording medium. By using the parameters mentioned above, we can discriminate the mark length by the unit of 2Tw in this example, and we discriminate the system of two remainders of the mark length expressed by the unit of Tw, in other words 0 or 1.

(b) in FIG. 7 shows the count signals 710 generated by the counter 200, and measures the time from the mark top by the unit of the detection window width Tw. The timing by which the count signal shift to zero (0) correlates with the top of marks or spaces. (c) in FIG. 7 shows the recording waveform at the time of forming mark 2Tw long, and the mark-forming period 305 includes the positive pulses 1Tw long with an injection energy level of Pw. (d) in FIG. 7 shows the recording waveform at the time of forming mark 3Tw long, and the mark-forming period 305 includes the positive pulses 1.5Tw long and Pw high.

(e), (g) and (i) in FIG. 7 represent the recording waveforms at the time of forming marks 4Tw, 6Tw and 8Tw long (in other words, generally 2 mTw long by taking m as an integer of 2 or more), and the mark-forming period 305 begins with the top part of mark-forming period 707 including a positive pulse 1.25Tw long and Pw high followed by a negative pulse 0.75 long and p1 high to be followed by the successive part of mark-forming period 708 including a single positive pulse m 1Tw long and Pw high separated by a negative pulse period 1Tw and Pb high.

(f) and (h) in FIG. 7 show the recording waveforms at the time of forming marks 5Tw and 7Tw (in other words, generally (2 m+1) Tw long by taking m as an integer of 2 or more), and the mark-forming period 305 begins with the top part of mark-forming period 707 including a positive pulse 1.75Tw long and Pw high and a following negative pulse 1Tw long and Pb high followed by a single positive pulse period 1Tw long and Pw high separated by a negative pulse period 1Tw long and Pb high. The mark non-forming period, without resorting to any space length, begins with a negative pulse period 1.5Tw long and Pb high and maintains a Pa level until the subsequent mark-forming period. According to the present example of recording waveform, the shortest cooling period in the mark-forming period 305 is 0.75Tw.

To recapitulate the descriptions above, according to the examples of recording waveforms 700-706 for the apparatus according to an embodiment of the present invention shown in FIG. 7, the pulse at the top of a mark-forming period is generated as described below when the integer constant p is set at p=−2.

(1) In the case of quotient d=0 obtained by dividing the value obtained by adding p=−2 to the mark length expressed by the unit of pitch of change in the symbol length by n=2,
  (1a) In the case of the remainder r=0 . . . the injection energy level=Pw, period=1Tw
  (1b) In the case of the remainder r=1 . . . the injection energy level=Pw, period=1.5Tw
(2) In the case of quotient d=1 or more obtained by dividing the value obtained by adding p=−2 to the mark length expressed by the unit of pitch of change in the symbol length by n=2,
  (2a) In the case of the remainder r=0 . . . the injection energy level=Pw, period=1.25Tw followed immediately by the level=Pb and period=0.75Tw
  (2b) In the case of the remainder r=1 . . . the injection energy level=Pw, period=1.75Tw followed immediately by the level=Pb and period=1Tw Depending on whether d=0 or otherwise, the waveform at the top of mark-forming period 507 is switched from one to the other. This is, as mentioned above, in order to compensate the difference in the impact of the immediately succeeding recording waveform to the top part of mark-forming period 507 depending on whether the succeeding part of mark-forming period 508 exists or not.

In addition, according to the examples of recording waveforms 700-706 for the apparatus according to an embodiment of the present invention, the pulses in the succeeding part of mark-forming period 508 are generated as described below.
(1) In the case of quotient d=0 obtained by dividing the value obtained by adding p=−2 to the mark length expressed by the unit of pitch of change in the symbol length by n=2, . . . no pulse is generated.
(2) In the case of quotient d=1 or more obtained by dividing the value obtained by adding p=−2 to the mark length expressed by the unit of pitch of change in the symbol length by n=2, . . . Positive pulses with an injection energy level Pw and a period=1Tw separated by negative pulses with an injection energy level Pb and a period=1Tw are repeated d times.

From the above description, a cycle of recording waveform in the succeeding part of mark-forming period 508 including positive pulses with an injection energy level=Pw and a period=1Tw separated by negative pulses with an injection energy level=Pb and a period=1Tw expands by a mark length of 2Tw per cycle. Immediately after the end of the mark-forming period 305, the cycle begins with a period with an injection energy level of Pb and 1.5Tw long followed by a period with an injection energy level of Pa that lasts until the beginning of the subsequent mark-forming period.

From the above description, the shortest time length of recording waveform pulse for the apparatus according to an embodiment of the present invention is 0.75Tw while the shortest length of the positive pulse or the negative pulse of the recording waveform pulse for the conventional apparatus is 0.5Tw, and the shortest cooling time and the shortest positive pulse time length in the examples of recording waveforms 700-706 for the apparatus according to an embodiment of the present invention is set at approximately one and half times the examples of recording waveforms 400-406 for the conventional apparatus. In other words, in the information recording apparatus according to an embodiment of the present invention, the frequency spectrum width of the laser driving current 124 for laser 110 serving as the means of generating energy is suppressed to approximately two thirds, and assuming that the frequency spectrum width of the laser driving current 124 is the same, it will be possible as we have mentioned earlier to form marks with such a high precision corresponding to up to approximately one and half times the recording linear speed of the conventional apparatus.

And in the examples of recording waveforms 700-705 for the apparatus according to an embodiment of the present invention, we treated the case of d=0 wherein there is no succeeding part of mark-forming period 508 immediately after the top part of mark-forming period 507 in the mark-forming period 305 as a special case and we generated pulses by switching the pulses of an injection energy level of Pw, period 1Tw or 1.5Tw depending on the mark length. In addition, in the case where the injection of energy into the recording medium immediately after the end of the mark-forming period 305 does not affect directly the top part of marks formed by the recording pulse of the top part of mark-forming period 507, in other word in the case of d≧1 wherein the top part of marks formed by the recording pulse of the top part of mark-forming period 507 is directly affected by the recording pulse in the succeeding part of mark-forming period 508, pulses with an injection energy level of Pw and a period of 1.25Tw or 1.75Tw depending on the mark length are generated as the recording pulses for the top part of mark-forming period 507, enabling thus to control very precisely mark edge positions.

As described above, the information recording apparatus according to an embodiment of the present invention enables to form high-precision marks even at the time of high-speed recording. This enables to use the mark edge recording method that is advantageous for realizing high recording linear density as a recording method. As this leads to the realization of a higher speed and higher reliability of recording/reproduction operations, and at the same time the miniaturization of information recording apparatuses and recording media, this will be advantageous in terms of the cost of apparatuses.

Figure 8:
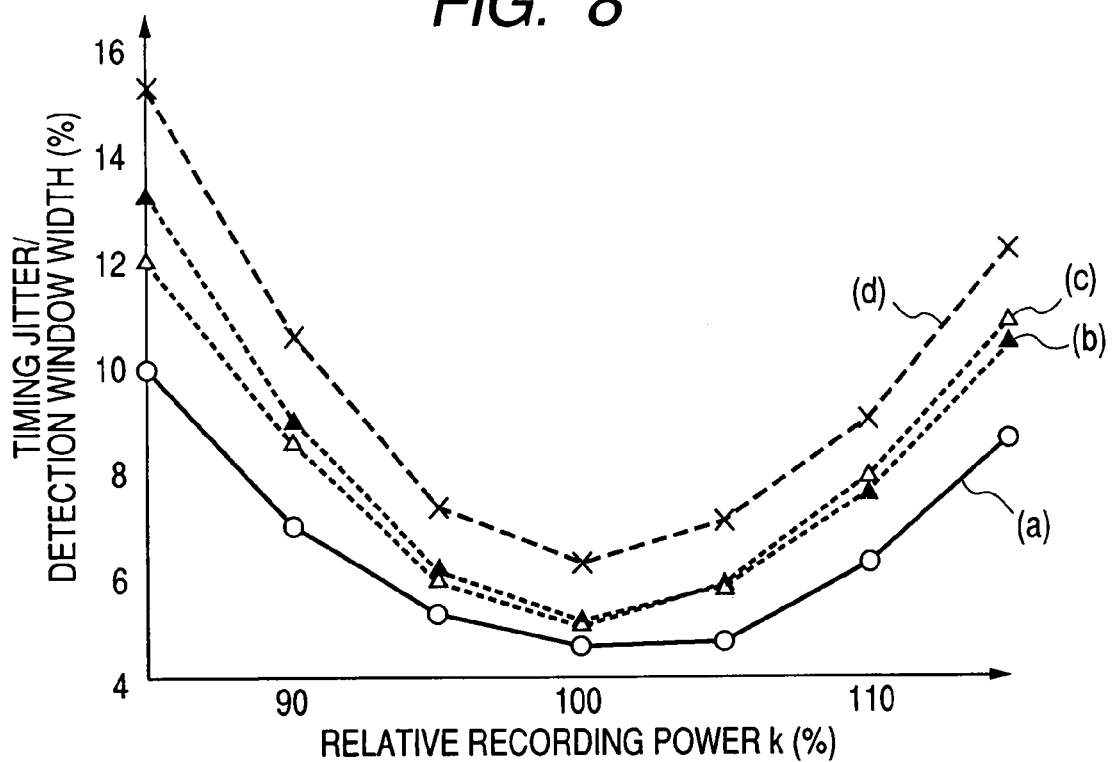
FIG. 8 is an illustration describing the suppressing effect of regenerative signal jitters by the recording waveforms of the recording processing system according to an embodiment of the present invention.

Than, in order to demonstrate the effect of achieving a high precision in forming marks by the recording waveform of the recording processing system according to an embodiment of the present invention, we will show in FIG. 8 an example of effects of suppressing regenerative signal jitters by the recording waveform of the recording processing system according to an embodiment of the present invention. In this comparative experiment, we chose a phase change type optical recording medium made of GeSbTe material for the recording medium, 29 m/s for the recording linear speed, Tw=3.8 ns for the detection window width, and a symbol length equivalent to 2Tw or more and 8Tw or less for the range allowable for the symbol length, and 2.6 ns for the rise and fall time of the driving current of the laser diode serving as the light source (period required from 10% to 90% of the range of change in current at the isolated step edge). And we chose an oscillation frequency of 405 nm for the laser diodes and a numerical aperture of NA=0.85 for the objective lens for focusing laser beams on the recording medium.

The plot (a) in FIG. 8 represents the ratio of the regenerative signal jitters to the detection window width when each recording power level remaining after Pb is removed from the bottom condition of the regenerative signal jitters is proportionally changed (the standard displacement of distribution superposed for all the mark length as to how all the edge positions have displaced from their ideal timing with reference to the timing clock extracted by operating the Phased Locked Loop circuit based on all the edge positions) in the case where the recording waveform according to an embodiment of the present invention we have described with reference to FIG. 7 is used, and the plot (d) represents the regenerative signal jitters when the recording waveforms according to the prior art that we have described with reference to FIG. 4 are used. And the plot (b) of FIG. 8 represents the recording waveform 1.25Tw long only for the period at the energy level Pw of FIG. 7(c) like in the case of the top pulse for (e), (g) and (i) in FIG. 7 (the rest is common with FIG. 7), and the plot (c) of FIG. 8 represents the recording waveform 1.75Tw long only for the period of energy level Pw of (d) in FIG. 7 in the same way as the top pulse of (f) and (h) in FIG. 7 (the rest being common with FIG. 7).

According to the recording waveform of the recording processing system according to the prior art that we described with reference to FIG. 4 and shown in the plot (d) of FIG. 8, as a result of the optimization of each recording power level, the reference recording power level turned out to be Pt=Pm=6.80 mW, Pa=1.90 mW, and Pb=0.10 mW. In this case, we could reduce the best value of the regenerative signal jitter to only approximately 6.3%. This is because, compared with the detection window width, that is in comparison with the recording condition of 3.8 ns, the repetition cycle Tw of recording pulses and the rise and fall of the driving current of laser diode are very slow at approximately 2.6 ns, and the desired recording waveform (the temporal change in the injection of recording energy to the recording medium) cannot be realized. And in this result, as the forming conditions of the power level that confers the maximum impact on the leading edge of each mark are considerably different depending on whether it is the pulse part having Pm level in the succeeding part of the mark-forming period 408 that forms its own mark (the case of a mark length having the succeeding part of the mark-forming period 408) or the preheating/erasure part having Pa level immediately after its own mark (the case of a mark length without the succeeding part of the mark-forming period 408), the power level or pulse width of the top pulse part that should essentially be different depending on the presence or absence of the succeeding part of the mark-forming period 408 is different from their respective optimum value. As a result, the value of the whole regenerative signal jitters has remarkably deteriorated in comparison with the case where the recording waveform of the recording processing system according to an embodiment of the present invention described further below are used.

In the case of the plots (b) and (c) of FIG. 8, as a result of optimization of each recording power level, the reference recording power level turned out to be Pw=6.70 mW, Pa=2.00 mW, and Pb=0.10 mW in the case of plot (b) of FIG. 8, and Pw=6.70 mW, Pa=1.95 mW and Pb=0.10 mW in the case of plot (c) of FIG. 8. In this case, the best value of the regenerative signal jitters turned out to be approximately 5.1% representing a certain improvement effect over the case of plot (d) of FIG. 8. In the case of plots (b) and (c) of FIG. 8, the value of regenerative signal jitters and the recording power margin improved considerably over the case of plot (d) of FIG. 8. However, in comparison with the case where we used the recording waveform of the recording processing system according to an embodiment of the present invention described further below, the effect of improvement is still inferior. This is because, as described above, the forming conditions of the power level that confers the maximum impact on the leading edge of each mark are remarkably different depending on whether it is the pulse part having Pw level in the succeeding part of the mark-forming period 508 that forms its own mark (the case of a mark length having the succeeding part of the mark-forming period 508) or the preheating/erasure part having Pa level immediately after its own mark (the case of a mark length without the succeeding part of the mark-forming period 508), the power level or pulse width of the top pulse part that should essentially be different depending on the presence or absence of the succeeding part of the mark-forming period 408 is different from their respective optimum value. As a result, the value of the whole regenerative signal jitters has deteriorated in comparison with the case where the recording waveform of the recording processing system according to an embodiment of the present invention described further below are used.

In contrast to these results according to the prior art, according to the recording waveforms of the recording processing system according to an embodiment of the present invention that we described with reference to FIG. 7 shown in the plot (a) of FIG. 8, as a result of optimization of each recording power level, the reference recording power level turned out to be Pw=7.30 mW, Pa=2.05 mW, and Pb=0.10 mW. In this case, the regenerative signal jitters improved remarkably to approximately 4.7%. This is because, as described above, the forming conditions of the power level of the leading edge that confers the maximum impact on the leading edge of each mark can be compensated according to the difference depending on whether it is the pulse part having Pm level in the succeeding part of the mark-forming period 508 that forms its own mark (the case of a mark length having the succeeding part of the mark-forming period 508) or the preheating/erasure part having Pa level immediately after its own mark (the case of a mark length without the succeeding part of the mark-forming period 508) by switching the recording waveform of the top part of the mark-forming period, and accordingly, in any mark length, the leading edge can be formed at the desired position with a high precision. As a result, in comparison with the case where the result of using the prior art described above, the overall value of the regenerative signal jitters is remarkably improved and the recording power margin is considerably expanded.

Figure 9:
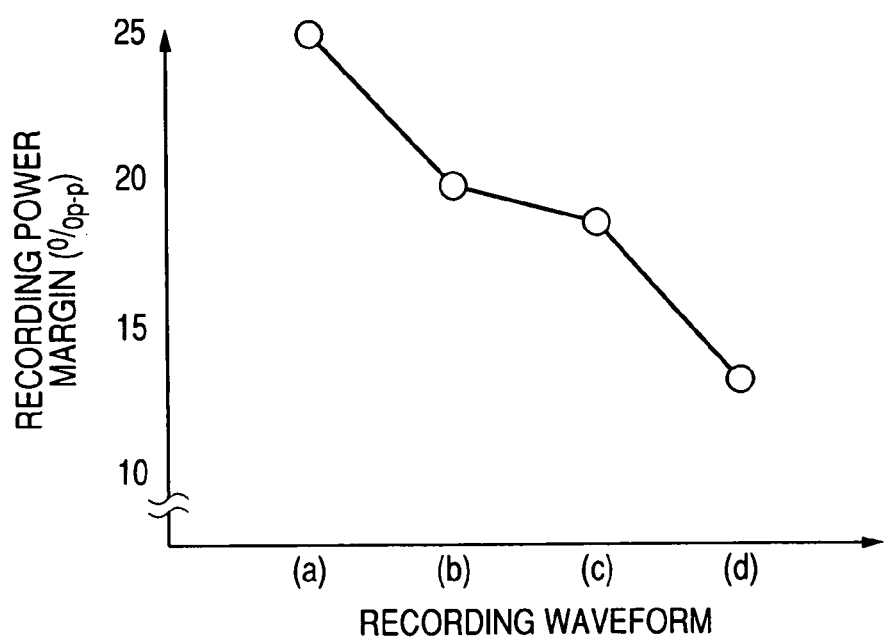
FIG. 9 is an illustration describing the expanding effect of recording power margin by the recording waveform of the recording processing system according to an embodiment of the present invention.

Finally, in order to show the effect of achieving high precision in forming marks by the recording waveform of the recording processing system according to an embodiment of the present invention from another viewpoint, we will show in FIG. 9 an example of the effect of expanding the recording power margin by the recording waveform of the recording processing system according to an embodiment of the present invention. The recording power margin is defined as the peak-to-peak value of a relative recording power wherein the regenerative signal jitters declines to 8% or less when each recording power level other than Pb is changed proportionately after the optimization of each recording power level in each recording waveform.

When the recording waveforms of the recording processing system according to the prior art described with reference to FIG. 4 and shown in plot (d) of FIG. 8 were used, the recording power margin was limited to only approximately 13% p-p, and it is difficult to realize a sufficiently reliable information recording and reproduction apparatus at this level. On the other hand, according to the recording waveforms based on the philosophy of the fifth prior art shown in plots (b) and (c) of FIG. 8, the recording power margin was extended to approximately 18-20% p-p, indicating a certain effect of improvement. And in the case of using the recording waveforms of the recording processing system according to an embodiment of the present invention described with reference to FIG. 7 and shown in the plot (a) of FIG. 8, the recording power margin expanded drastically to approximately 25% p-p, and it became possible to realize a practically reliable information recording and reproduction apparatus.

As described above, the information recording apparatus according to an embodiment of the present invention enables to form high-precision marks even during high-speed recording, and as efforts are made to realize high-speed and reliable recording and reproduction operations and to make the information recording apparatus and recording media more compact at the same time, these measures are likely to lead to savings in apparatus costs.

What is claimed is:

1. An information recording apparatus for recording information by injecting energy on a recording medium and forming marks of different physical characteristics with the unrecorded part, comprising:

an encoder for converting information into a recording data sequence;

a discriminator for discriminating marks of the length of a natural number k times of the unit L of pitch of variation in the symbol length according to the quotient d obtained by and the remainder r remaining after dividing k by an integer constant n of 2 or more with reference to the mark length in the recording data sequence;

an energy generator for generating the energy necessary for recording; and a driver for driving the energy generator in such a way that the shortest time interval between the points of change in the ratio of energy injected per unit time during the mark-forming period which is not shorter than ½ of the length of time corresponding to the symbol length L according to the result of discrimination by the discriminator, wherein the discriminator controls the energy generator in such a way that the top part of the mark-forming period may have mutually different waveforms of the top part of the mark-forming period chosen by r according to the remainder r remaining after dividing k+p of the mark length $k*L(a \leq k \leq a+n-1)$ by n for any mark $a*L$ or more and $(a+n-1)*L$ or less by setting the range chosen for the mark length according to the rule of conversion in case that the mark length is between a times of L or more and b times of L or less and by choosing any optional integer constant for p, wherein the discriminator controls the energy generator in such a way that the mark-forming period target length may have succeeding part of mark-forming period formed by the repetition of positive pulses of d times according to a recording pulse having a time cycle corresponding to the length $n*L$ on the recording medium following a n number of different top parts of mark-forming period chosen by r according to the quotient d obtained and the remainder r remained after dividing k+p of the mark length $k*L(a+n \leq k \leq b)$ by n for any marks $(a+n)*L$ or more and $b*L$ or less, and wherein when the mark-forming period target length is $a*L$ or more and $(a+n-1)*L$ and the mark-forming period target length is $(a+n)*L$ or more and $b*L$ or less, the waveform of the top part of mark-forming periods for the same remainder r is respectively different according to whether the mark-forming period target length is $a*L$ or more and $(a+n-1)*L$ or less, or $(a+n)*L$ or more and $b*L$ or less.

2. The information recording apparatus according to claim 1, wherein p is equal to −a.

* * * * *